(12) United States Patent
Okamoto

(10) Patent No.: US 6,709,006 B2
(45) Date of Patent: Mar. 23, 2004

(54) AIR BAG DEVICE

(75) Inventor: Hideaki Okamoto, Echi-gun (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 10/000,955

(22) Filed: Dec. 4, 2001

(65) Prior Publication Data

US 2002/0070536 A1 Jun. 13, 2002

(30) Foreign Application Priority Data

Dec. 11, 2000 (JP) ......................................... 2000-375455

(51) Int. Cl.[7] ................................................ B60R 21/16
(52) U.S. Cl. ................................................... 280/728.2
(58) Field of Search ........................... 280/728.1, 728.2, 280/732, 731, 740, 741

(56) References Cited

U.S. PATENT DOCUMENTS

| 4,915,410 | A | * | 4/1990 | Bachelder ................ 280/728.2 |
| 5,290,059 | A | * | 3/1994 | Smith et al. ............... 280/728.2 |
| 5,605,347 | A | * | 2/1997 | Karlow et al. ............ 280/728.2 |
| 6,173,988 | B1 | | 1/2001 | Igawa ....................... 280/728.2 |
| 6,394,486 | B1 | * | 5/2002 | Fujimura et al. ......... 280/728.2 |
| 6,435,548 | B2 | * | 8/2002 | Suzuki et al. ................ 280/732 |
| 2001/0011816 | A1 | | 8/2001 | Suzuki et al. | |

* cited by examiner

*Primary Examiner*—Paul N. Dickson
*Assistant Examiner*—Faye M. Fleming
(74) *Attorney, Agent, or Firm*—Foley & Lardner

(57) ABSTRACT

An air bag device providing for reduced effects of heat on a bag. A bag and an inflator of an air bag device are affixed in a retainer by a bag plate. The bag plate includes a semi-circular arch portion and flanges formed at the sides of the arch portion. The arch portion of the bag plate is provided with circular openings and beads projecting toward the inside, the beads being disposed at the outer sides of the circular openings, respectively. When assembled, the beads are in line contact with a cylindrical outer face of the inflator. By virtue of the beads, the area of direct contact between the bag plate and the cylindrical outer face of the inflator is reduced and a gap is formed therebetween. As a result, heat generated when the inflator operates is not likely to be transmitted to the bag plate.

12 Claims, 5 Drawing Sheets

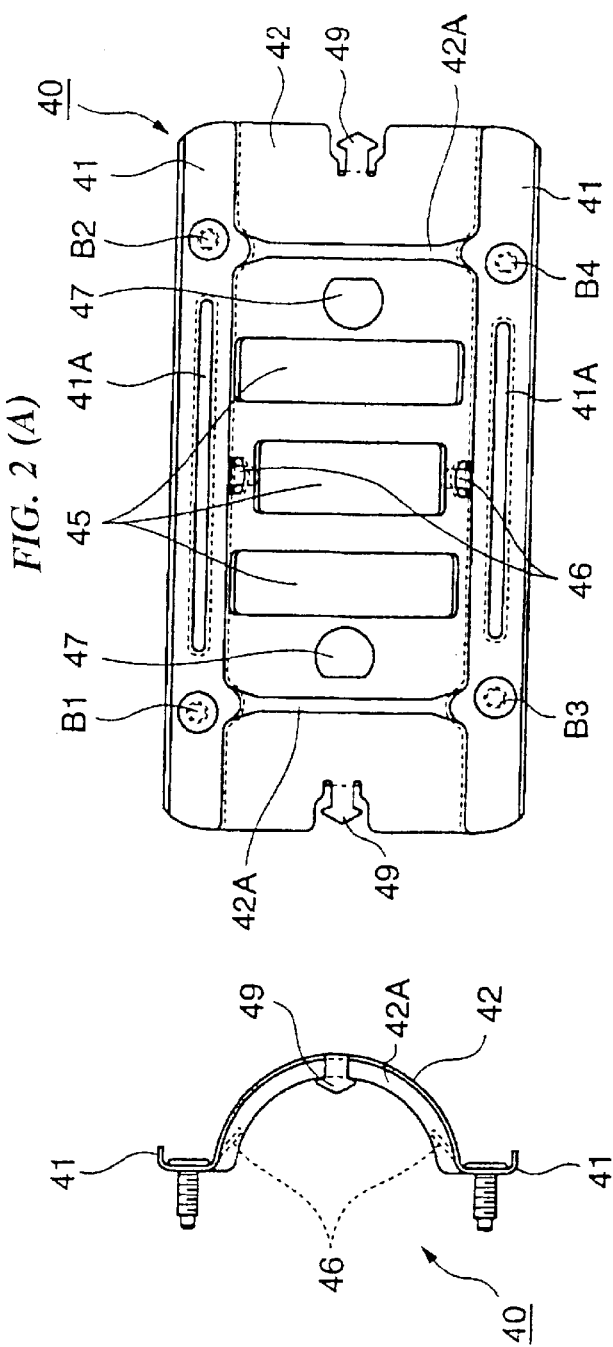
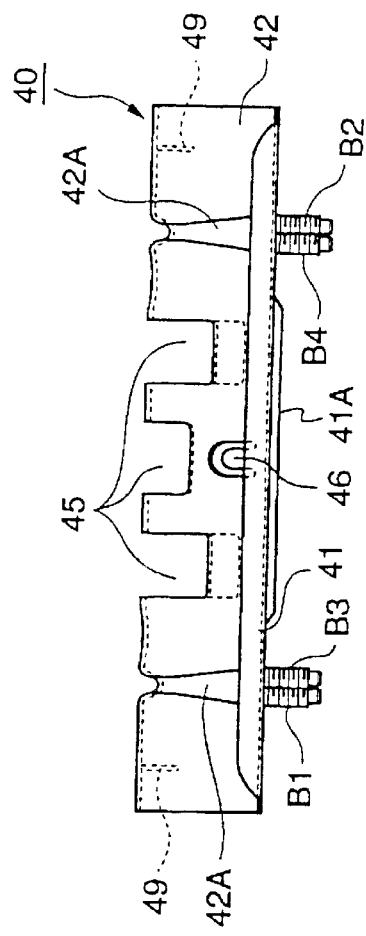

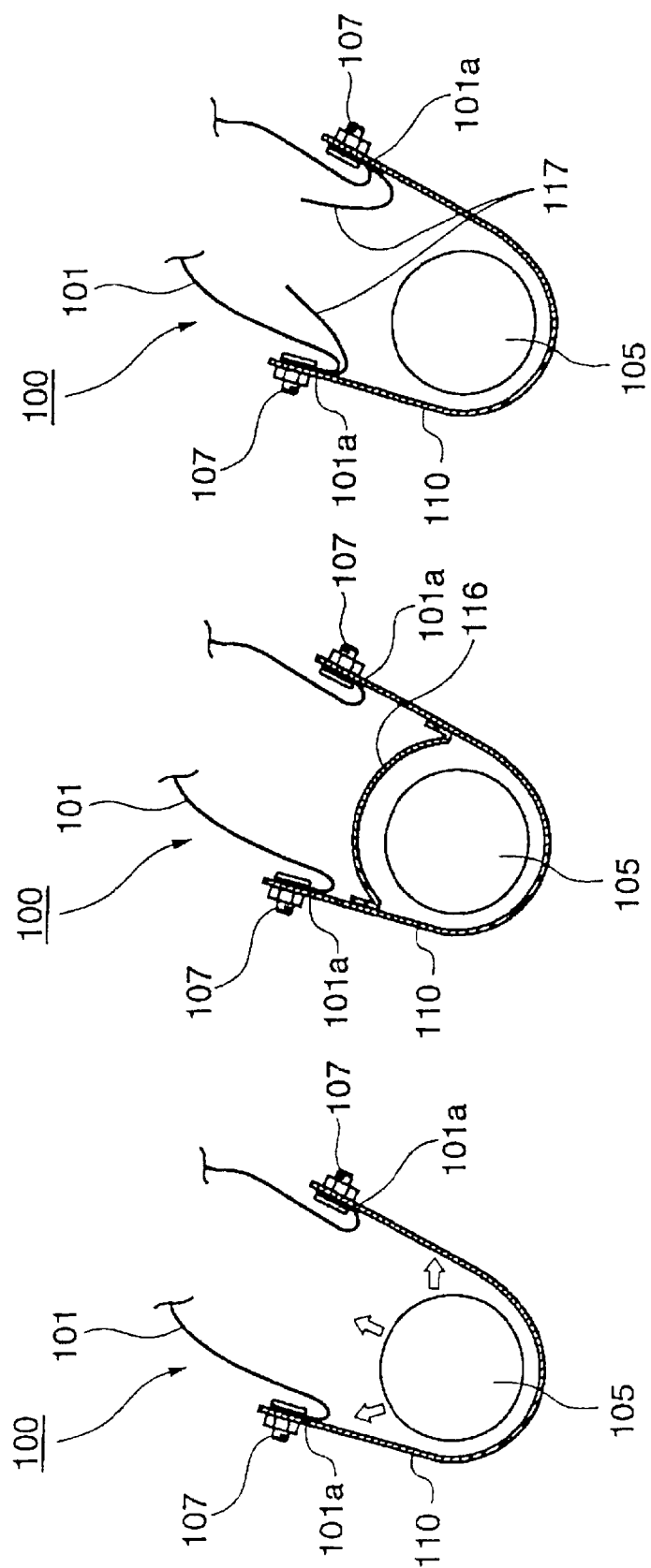

AIR BAG DEVICE

BACKGROUND

The present invention relates to air bag devices which inflate and spread for protecting vehicle occupants in cases of emergency. In particular, the present invention relates to an air bag device in which undesirable effects of heat on a bag body, which is generated when an inflator ignites, can be suppressed, and in which components can be assembled easily.

At present, vehicles are generally provided with air bag devices for drivers, for passengers, and for rear seats, side air bags, and the like, which are used for protecting occupants in cases of emergency. Each air bag device generally includes a bag, an inflator which supplies gas to inflate the bag, a retainer for retaining the bag and the inflator, and the like as a module to be mounted to the vehicle.

FIGS. 5(A), 5(B), and 5(C) are schematic cross-sectional views of known air bag devices.

In FIG. 5(A), an air bag device 100 includes a box-shaped metallic retainer 110. The retainer 110, when used in an air bag device for a passenger's seat, is disposed in an instrument panel of the automobile. A cylindrical inflator 105 is disposed in the bottom of the retainer 110. The inflator 105 may be appropriately selected from a compressed-gas-type inflator and a combustion-gas-type inflator. The inflator 105 is fixed to the retainer 110 by bolts and nuts (not shown).

A bag 101 is mounted to the retainer 110 with a holding portion (open end) 101a of the bag 101 being affixed at an upper opening of the retainer 110 by bolts and nuts 107. Regarding the bag 101, only the holding portion 101a thereof in inflating states is shown in the drawings. In an emergency, spreading gas is supplied into the bag 101 through gas outlets disposed on the side of the inflator 105. The bag 101 is generally folded and is received in the retainer 110.

When a combustion-gas-type inflator is used as the inflator 105 in the air bag device 100, it is likely that the holding portion 101a of the bag 101 is deformed due to the heat generated by the gases from the inflator 105, thereby causing leakage of the combustion gas. Therefore, in the known air bag device 100, a predetermined distance is provided between the position at which the holding portion 101a of the bag 101 is mounted (the level of the bolts-nuts 107) and the inflator 105.

However, when the holding portion 101a of the bag 101 and the inflator 105 are separated by a certain distance, the height of the retainer 110 is increased, and the overall air bag device 100 is enlarged. Although a compressed-gas-type inflator, which generates little heat, may be used as the inflator 105 so as to minimize the above distance, freedom of the selection of inflator becomes limited due to the increased size of the device.

In order to overcome the aforementioned drawbacks, the following modifications, for example, have been given to the known air bag devices.

As shown in FIG. 5(B), the retainer 110 is provided with a mid plate (diffuser) 116 between the holding portion 101a of the bag 101 and the inflator 105. By providing the mid plate 116, spreading gas jets out concentrating in one direction (to the center of the bag 101). Therefore, heat generated when the inflator 105 fires does not directly affect the holding portion 101a of the bag 101.

In FIG. 5(C), a protection cloth 117 is provided at the open end of the bag 101. The deformation of the holding portion 101a of the bag 101 is suppressed by the protection cloth 117.

However, with the arrangements shown in FIGS. 5(B) and 5(C), additional components (i.e., the mid plate 116 or the protection cloth 117) are required. Therefore, there is a drawback in that costs for components are increased and the number of manufacturing processes is also increased.

Moreover, in each of the air bag devices shown in FIGS. 5(A) to 5(C), the holding portion 101a of the bag 101 and the inflator 105 are individually affixed to the retainer 110 by using the bolts-nuts 107 and other bolts and nuts (not shown), respectively, whereby the assemble of the components is complex.

Another airbag device is shown in U.S. Pat. No. 6,173,988, which is incorporated by reference herein.

Accordingly, an object of the present invention is to provide an air bag device in which undesirable effects of heat, which is generated when the inflator fires, onto a bag body can be reduced and components of the air bag device can be assembled easily.

SUMMARY OF THE INVENTION

According to the present invention, an air bag device is provided. The device includes an inflatable bag and an inflator for supplying gas to expand the bag. A retainer is provided for retaining the bag and the inflator. A plate is also provided for fixing the inflator to the retainer and the bag to the retainer at a holding portion of the bag. The plate includes a mechanism disposed between the plate and the inflator for suppressing the transmission of heat from the inflator to the plate.

The inflator may be cylindrical and the plate may include an inner face along the cylindrical outer face of the inflator. The mechanism may include a bead formed on the inner face of the plate and positioned to be in contact with the cylindrical outer face of the inflator.

According to an alternative embodiment of the present invention an airbag device is provided. The airbag includes an open end; an inflator for supplying gas into the open end of the bag; a retainer for holding the inflator; and a plate connected to the retainer wherein the inflator is positioned between the plate and the retainer and the open end of the bag is fixed between the retainer and the plate. The plate includes a portion projecting toward the inflator to reduce the conduction of heat from the inflator to the plate.

An air bag device having an inflator positioned between a retainer and a plate, wherein an open end of an inflatable airbag is secured between the retainer and the plate, and wherein contact between the plate and the inflator is limited to contact between a projecting portion of the plate and the inflator.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

FIG. 2(A) is a plan view of a bag plate of the air bag device.

FIG. 2(B) is a front view of the bag plate.

FIG. 2(C) is a side view of the bag plate.

FIG. 5 includes schematic cross-sectional views of known air bag devices.

DETAILED DESCRIPTION

Figure 1:
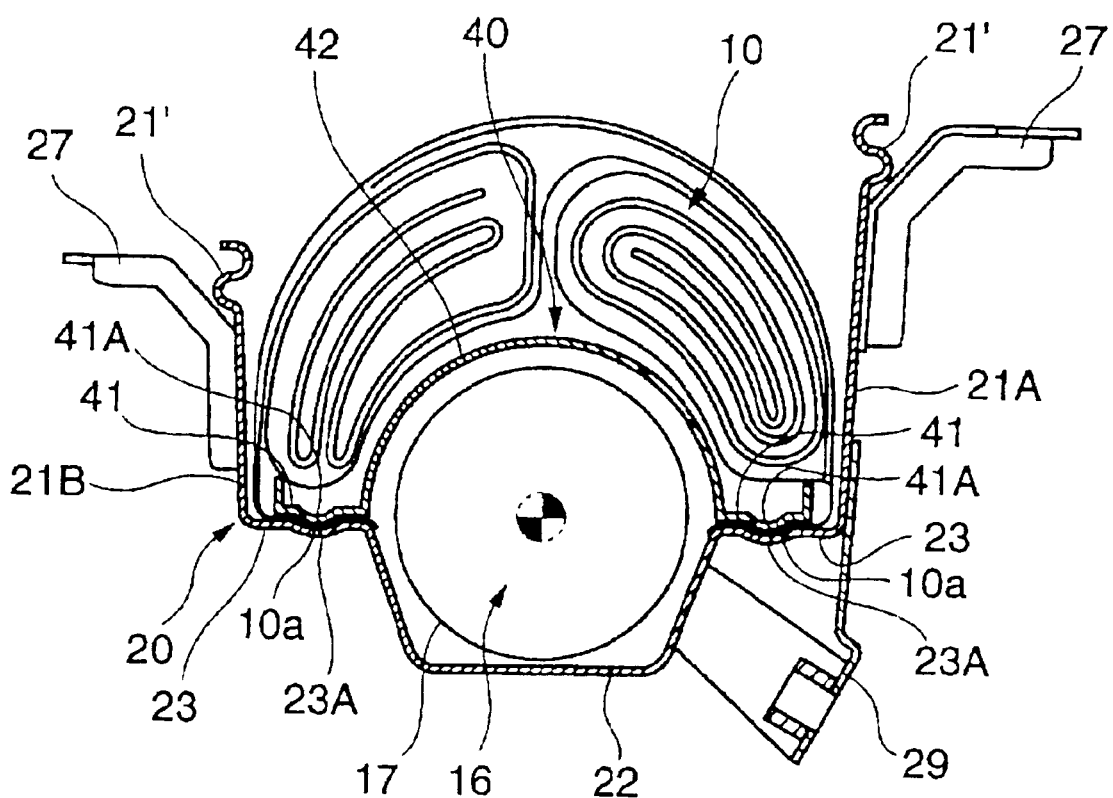
FIG. 1 is a cross-sectional view of an air bag device according to an embodiment of the present invention.

Embodiments according to the present invention are described below with reference to the drawings.

According to the present invention, an air bag device may comprise a bag which inflates and spreads in front of a vehicle occupant in an emergency; an inflator for supplying gas into the bag, the gas to expand the bag; a retainer for retaining the bag and the inflator; a fixing member (bag plate) for fixing the inflator to the retainer and the bag to the retainer at a base of the bag; and a heat-transmission-suppressing member disposed between the bag plate and the inflator, for suppressing the transmission of heat, generated when the inflator operates, to the bag plate.

According to the present invention, the transmission of heat generated when the inflator operates is suppressed by the heat-transmission-suppressing member of the bag plate. As a result, it is not necessary to additionally provide a mid plate, a protection cloth, etc., as in the known air bag devices. Therefore, effects of the heat of the inflator on the bag body can be avoided and the structure of the air bag device can be made simple.

In each known air bag device, the holding portion of the bag and the inflator were individually fixed to the retainer by using bolts and nuts or the like. However, according to the present invention, the base of the bag and the inflator can be fixed to the retainer at the same position, whereby the number of components can be reduced.

In the air bag device according to the present invention, the inflator may have a cylindrical shape, the bag plate may include an inner face along the cylindrical outer face of the inflator, at least one linear projection (bead) may be formed on the inner face of the bag plate, and the at least one bead formed on the inner face of the bag plate may be in contact with the cylindrical outer face of the inflator.

With this arrangement, the bead of the bag plate is in line contact with the cylindrical outer face of the inflator, whereby the area of direct contact between the bag plate and the cylindrical outer face of the inflator is reduced. Therefore, heat generated when the inflator operates is not likely to be transmitted to the bag plate. The bead can be formed easily by stamping or the like, thereby suppressing the increase of the manufacturing costs of the components.

In the air bag device according to the present invention, the retainer may include an inner face along the cylindrical outer face of the inflator, at least one linear projection (bead) may be formed on the inner face of the retainer, and the at least one bead formed on the inner face of the retainer may be in contact with the cylindrical outer face of the inflator.

With this arrangement, the cylindrical inflator can be placed on the retainer in a correct position via the bead of the retainer, and be mounted in the retainer by being clamped between the bead of the bag plate and the bead of the retainer. Therefore, the inflator can be reliably affixed, and the air bag device can be manufactured in an easy manner.

In the air bag device according to the present invention, a predetermined gap may be provided between a gas outlet of the inflator and the bag plate.

With this arrangement, the inflator and the bag plate are disposed with a gap therebetween and do not come into close contact with each other. Therefore, gas ejected from the inflator easily passes along the bag plate, and the heat of the inflator is not likely to affect the bag because the bag and the inflator are disposed with the gap therebetween.

The above gap is preferably a gap having a size selected from values in a range of approx. 2 mm≦h≦5 mm.

In the air bag device according to the present invention, the bag plate may comprise a fixing portion for affixing the bag at an intermediate part of an open end of the holding portion of the bag. By affixing the bag at an intermediate part of an open end of the holding portion, the number of manufacturing processes can be reduced to a minimum, and the bag can be reliably affixed at the holding portion thereof.

As shown in FIG. 1, the air bag device according to the present embodiment includes: a bag 10 which inflates and spreads in an emergency; an inflator 16 which supplies gas for inflating and spreading the bag 10; a retainer 20 which receives and affixes the bag 10 and the inflator 16; a bag plate 40 which fixes the bag 10 and the inflator 16 to the retainer 20; an acceleration sensor and an electric circuit which operate the inflator 16 in an emergency, and a cover (not shown) These components are described below in detail.

The bag 10 is a bag-shaped woven fabric including nylon or the like. The bag 10 is generally received in the retainer 20 in a folded state, as shown in FIG. 1. The bag 10 is affixed together with the inflator 16 onto the retainer 20 at a holding portion 10a of the bag 10 by the bag plate 40. A manner in which the holding portion 10a of the bag 10 is affixed by the bag plate 40 is described below with reference to FIG. 3.

The inflator 16 is a device which produces gas for inflating and spreading the bag 10. A conventional inflator can be used as the inflator 16. The inflator 16 has a cylindrical shape having a cylindrical outer face 17, as shown in FIG. 1, and contains propellants therein. A plurality of gas outlets are provided on the cylindrical outer face 17. The inflator 16 is connected to an initiator. The initiator ignites the propellant in the inflator 16 in response to an ignition signal from a sensor.

Figure 4:
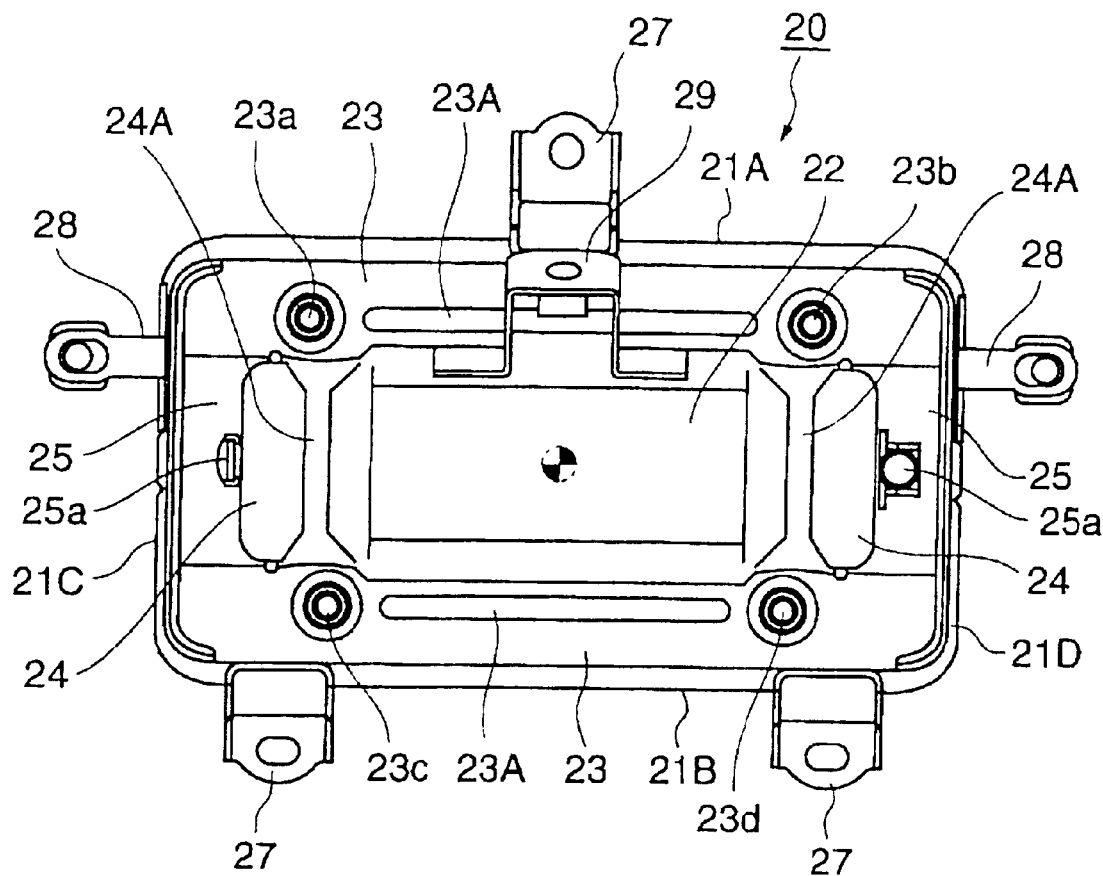
FIG. 4 is a plan view from the back or rear side of a retainer of the air bag device.

The retainer 20 includes a bottom portion 22 on which the inflator 16 is disposed, as shown in FIGS. 1 and 4. The center area (in sectional view in FIG. 1) of the bottom portion 22 is bent and bulged in the outside direction in a half hexagon. Left and right ends 24 of the center area shown in FIG. 4 are each formed in a section of half circle bulged in the outside direction. The ends 24 are each provided with a bead 24A projecting toward the inside (toward the upper side of the bottom portion 22). When assembled, each bead 24A is in line contact with the inflator 16 at the cylindrical outer face 17 thereof. The projection of each bead 24A is preferably not smaller than approximately 2 mm and not greater than approximately 5 mm.

Flange-shaped fixing parts 23 are formed at upper sides of the bottom portion 22. The fixing parts 23 are provided therein with four bolt-holes 23a to 23d. The distance between the bolt-holes 23a and 23b is set greater than the distance between the bolt-holes 23c and 23d. These bolt-holes 23a, 23b, 23c, and 23d are formed to correspond with bolts B1, B2, B3, and B4 (see FIG. 2) each respectively, for affixing the bag 10 and the bag plate 40. The distance between the bolt-holes 23a and 23b and the distance between the bolt-holes 23c and 23d differ from each other. As a result, errors in mounting the bag plate 40 to the retainer 20 can be avoided.

The fixing parts 23 of the retainer 20 are individually provided with linear beads 23A each formed between the bolt-holes 23a and 23b or the bolt-holes 23c and 23d. The beads 23A serve to reinforce the retainer 20. The function of the beads 23A differs from that of the above-described beads 24A. A semi-annular arch 25 is provided next to the ends 24 each of the left and right ends of the fixing parts 23 so that the arch 25 is projected toward inside of the retainer 20. The arch 25 is provided with a hole 25a formed in the arch 25. When assembled, the hole 25a mates with each protrusion 49 formed on the bag plate 40.

Sidewalls 21A to 21D stand from four sides, respectively, of the bottom part 22 of the retainer 20. In FIG. 1, the sidewall 21A extends higher than the sidewall 21B. The sidewalls 21C and 21D perpendicular to the sidewalls 21A and 21B of the retainer 20 are each provided with a hole (not shown) cut away in a semicircle, which is along the edge of the arch 25. The inflator 16 is inserted through one of these holes. A waveform or bend 21' is formed at an upper edge of each of the sidewalls 21A to 21D (see FIG. 1). The waveform 21' serves for reinforcement against impact applied when the bag inflates and spreads.

A mounting bracket 29 is fixed to the retainer 20 at the bottom portion 22 and the outer face of the sidewall 21A of the retainer 20 by spot welding or the like. The mounting bracket 29 is used for mounting the retainer 20 to an inner frame of a vehicle. Mounting brackets 27 for mounting the retainer 20 to an instrument panel of the vehicle are fixed to the sidewalls 21A and 21B at the side faces thereof by spot welding or the like. The sidewalls 21C and 21D are each provided at an upper edge thereof with another mounting bracket 28.

Figure 3:
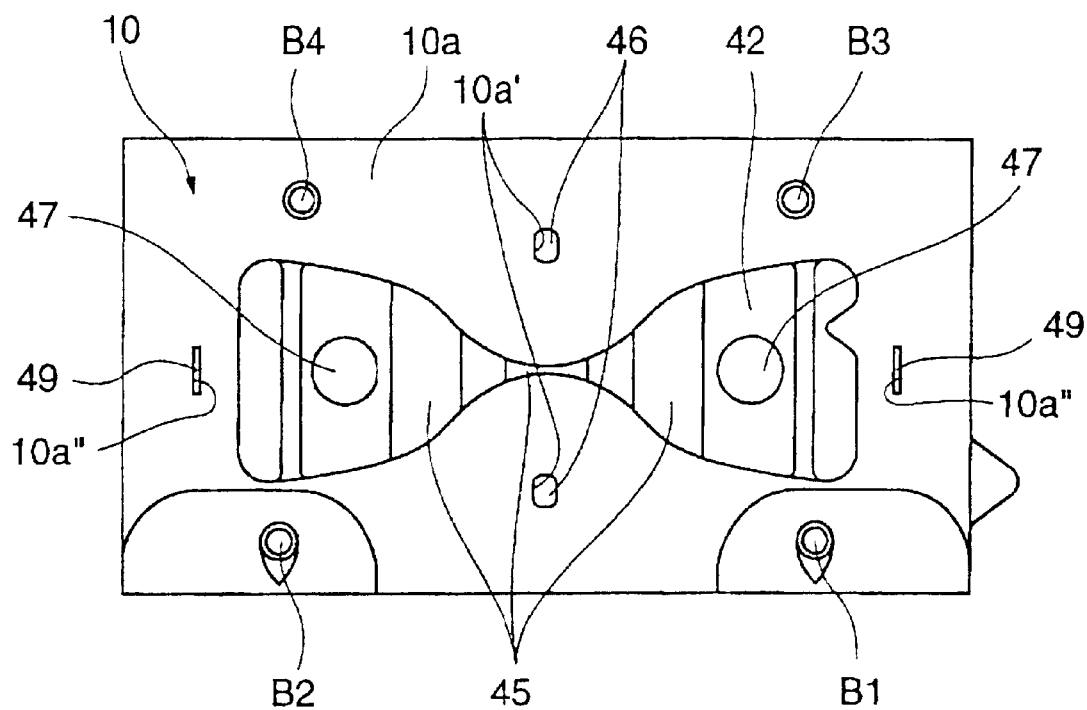
FIG. 3 is a plan view from the rear side of the air bag device in which the bag plate is assembled with a bag at a base thereof.

The bag plate 40 shown in FIGS. 1 to 3 affixes the bag 10 and the inflator 16 in the retainer 20. As clearly shown in FIGS. 2(A) to 2(C), the bag plate 40 includes a semi-circular arch portion 42 including flanges 41 formed at sides of the arch portion 42. Three rectangular openings 45 and substantially circular openings 47, through which gas passes from the inflator 16, are formed in a central part of the arch portion 42. The substantially circular openings 47 are individually disposed at the outer sides of the rectangular openings 45.

The arch portion 42 of the bag plate 40 is provided with beads 42A projecting toward the inside (toward the back face of the arch portion 42) at the outer sides of the respective circular openings 47 (toward the left and right ends in FIG. 2(A)). When assembled, the beads 42A are in line contact with the cylindrical outer face 17 of the inflator 16. The projection of each bead 42A is preferably not smaller than approximately 2 mm and not greater than approximately 5 mm. The projection of each bead 42A forms a gap between the cylindrical outer face 17 of the inflator 16 and the inner face of the arch portion 42 of the bag plate 40. As a result of the provision of the beads 42A, the area of direct contact between the bag plate 40 and the cylindrical outer face 17 of the inflator 16 is reduced and the gap is formed therebetween, whereby heat produced when the inflator 16 operates is not likely to be transmitted to the bag plate 40.

The arch portion 42 of the bag plate 40 is provided with hooks 46 formed by being cut away in a longitudinally intermediate part of the arch portion 42. In FIG. 3, the hooks 46 affix the holding portion 10a of the bag 10 at a widthwise intermediate part of the holding portion 10a such that the holding portion 10a of the bag 10 is hooked on the hooks 46 at holes 10a' of the holding portion 10a. The protrusions 49 are formed by being cut away at the left and right outer ends of the arch portion 42, respectively. The protrusions 49 can be bent toward the inside of the arch portion 42, as shown in FIGS. 2(B) and 2(C), and pass through respective sides 10a" of the holding portion 10a of the bag 10, as shown in FIG. 3. The sides 10a" may be formed in a slit or a hole. During assembly, the protrusions 49 are inserted through the respective holes 25a of the arches 25 of the retainer 20.

The flanges 41 of the bag plate 40 are provided with the bolts B1 to B4 inserted and disposed at positions of the flanges 41 associating with the holes 23a to 23d of the fixing parts 23 of the retainer 20. The bag plate 40 and the bag 10 are fixed to the retainer 20 by the bolts B1 to B4, and the inflator 16 is affixed between the arch portion 42 of the bag plate 40 and the bottom part 22 of the retainer 20. Each flange 41 is provided with a straight bead 41A between the bolts B1 and B2 or the bolts B3 and B4. The beads 41A serve to reinforce the bag plate 40. The beads 41A and 42A may be formed by a method such as stamping.

The above described air bag device may be assembled as described below. The air bag device according to the present embodiment is formed such that the bag 10 and the bag plate 40 are first assembled with each other, as shown in FIG. 3. The holding portion 10a of the bag 10 is hooked on the hooks 46 of the bag plate 40 at the holes 10a', respectively, of the holding portion 10a of the bag 10, and the protrusions 49 of the bag plate 40 are inserted into the sides 10a", respectively, of the holding portion 10a of the bag 10. Thus, the holding portion 10a of the bag 10 is fixed to the bag plate 40.

Then, the bag 10 and the bag plate 40 assembled with each other are placed at the inner side of the retainer 20. In this case, since the distance between the bolt-holes 23a and 23b of one of the fixing parts 23 of the retainer 20 and the distance between the bolt-holes 23c and 23d of the other one of the fixing parts 23 (the distance between the bolts B1 and B2 of the bag plate 40 and the distance between the bolts B3 and B4 thereof) differ from each other. As a result, errors in assembly of the bag plate 40 with the retainer 20 are avoided. After the bag 10 and the bag plate 40 are positioned in the retainer 20, the bolts B1 to B4 are partially tightened.

The inflator 16 is inserted into the retainer 20 from the side of the sidewall 21C or 21D thereof, and the bolts B1 to B4 are completely tightened. When thus assembled, the beads 42A of the bag plate 40 and the beads 24A of the retainer 20 are in contact with the cylindrical outer face 17 of the inflator 16. That is, the inflator 16 is affixed by being sandwiched between the retainer 20 and the bag plate 40. The bag plate 40 may be mounted after the inflator 16 is mounted on the bottom part 22 of the retainer 20.

The air bag device is affixed in a vehicle via the brackets 27, and the mounting brackets 28 and 29 of the retainer 20. For example, when the air bag device is used for a passenger's seat, the air bag device is affixed in an instrument panel of the vehicle.

The bag 10 of the air bag device is generally received in the retainer 20 in a folded state, as shown in FIG. 1. When the vehicle collides, a sensor (not shown) operates and sends an ignition signal to an initiator of the inflator 16. Then, the initiator ignites so that the propellants in the inflator 16 burn, thereby producing gas which is ejected from gas outlets of the inflator 16. The ejected gas is supplied into the bag 10 through the rectangular openings 45 and the circular openings 47 of the bag plate 40.

Since the beads 42A of the bag plate 40 are in line contact with the cylindrical outer face 17 of the inflator 16, the area of direct contact between these components is small, whereby heat generated when the inflator 16 operates is not likely to be transmitted to the bag plate 40. A gap is ensured between the gas outlets disposed on the cylindrical outer face 17 of the inflator 16 and the inner face of the arch portion 42 of the bag plate 40, the amount of the gap equaling the projection of each bead 42A. Therefore, the cylindrical outer face 17 of the inflator 16 and the arch portion 42 of the bag plate 40 do not come into close contact with each other, whereby the heat of the inflator 16 is not likely to affect the bag 10.

As described above, according to the present invention, an air bag device is provided, in which the undesirable effect of heat, which is generated when an inflator is ignited, on a bag is suppressed, and the components can be easily assembled with each other.

The priority application, Japanese Patent Application No. 2000-375455, published on Jun. 26, 2002 as 2002-178868, is hereby incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An air bag device comprising:
   an inflatable bag;
   an inflator for supplying gas to expand the bag;
   a retainer for retaining the bag and the inflator;
   a plate for fixing the inflator to the retainer and the bag to the retainer at a holding portion of the bag;
   wherein the holding portion of the bag is sandwiched between the plate and the retainer; and
   wherein the plate includes a mechanism disposed between the plate and the inflator for suppressing the transmission of heat from the inflator to the plate.

2. The air bag device of claim 1, wherein the inflator is in a cylindrical form and the plate includes an inner face along the cylindrical outer face of the inflator; and wherein the mechanism comprises a bead formed on the inner face of the plate and positioned to be in contact with the cylindrical outer face of the inflator.

3. The air bag device of claim 2, wherein the retainer includes an inner face along the cylindrical outer face of the inflator, and a bead formed on said inner face of the retainer, wherein the bead is in contact with the cylindrical outer face of the inflator.

4. The air bag device of claims 1, wherein the mechanism is configured to provide a predetermined gap between a gas outlet of the inflator and the bag plate.

5. The air bag device of claim 1, wherein the plate comprises a section for affixing an open end of the bag to the retainer.

6. An airbag device comprising:
   an inflatable airbag having an open end;
   an inflator for supplying gas into the open end of the bag;
   a retainer for holding the inflator;
   a plate connected to the retainer wherein the inflator is positioned between the plate and the retainer and the open end of the bag is fixed between the retainer and the plate;
   wherein the open end of the airbag is pressed between a portion of the plate and a portion of the retainer; and
   wherein the plate includes a portion projecting toward the inflator to reduce the conduction of heat from the inflator to the plate.

7. An air bag device having an inflator positioned between a retainer and a plate, wherein an open end of an inflatable airbag is secured between the retainer and the plate, and wherein contact between the plate and the inflator is limited to contact between a projecting portion of the plate and the inflator.

8. The air bag device of claim 5, wherein the section of the plate includes a bead projecting toward the retainer, and wherein the open end of the airbag is in contact with and fixed between the bead and the retainer.

9. The airbag device of claim 8, wherein the retainer includes a bead projecting in the same direction as and corresponding to the bead on the plate so that the open end of the airbag is fixed between the bead on the plate and the bead on the retainer.

10. The airbag device of claim 6, wherein the portions of the plate and the retainer pressing on the open end of the airbag include corresponding beads projecting in the same direction.

11. The airbag device of claim 7, wherein the open end of the airbag is pressed between corresponding beads located on the plate and the retainer.

12. The airbag device of claim 11, wherein the beads located on the plate and the retainer project in the same direction.

* * * * *